UNITED STATES PATENT OFFICE.

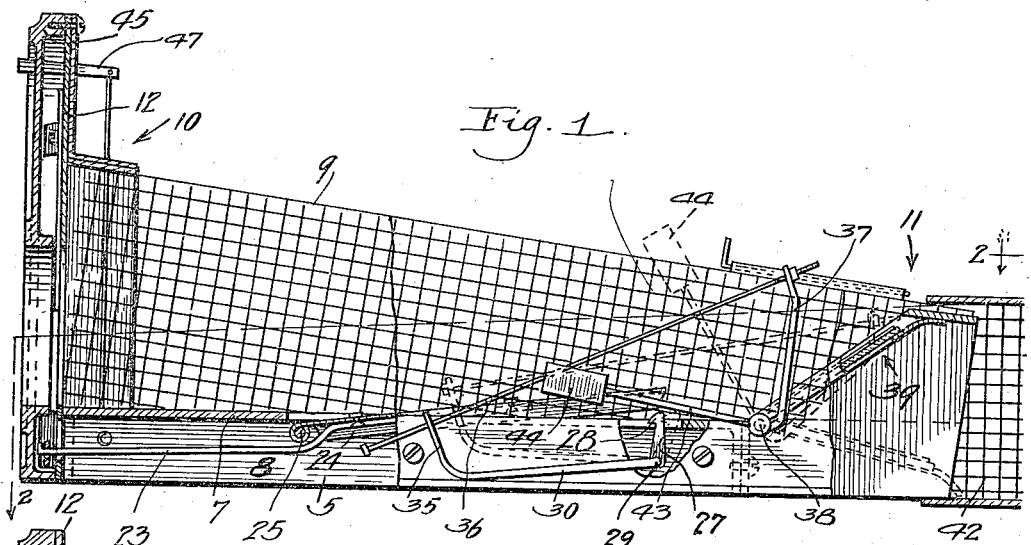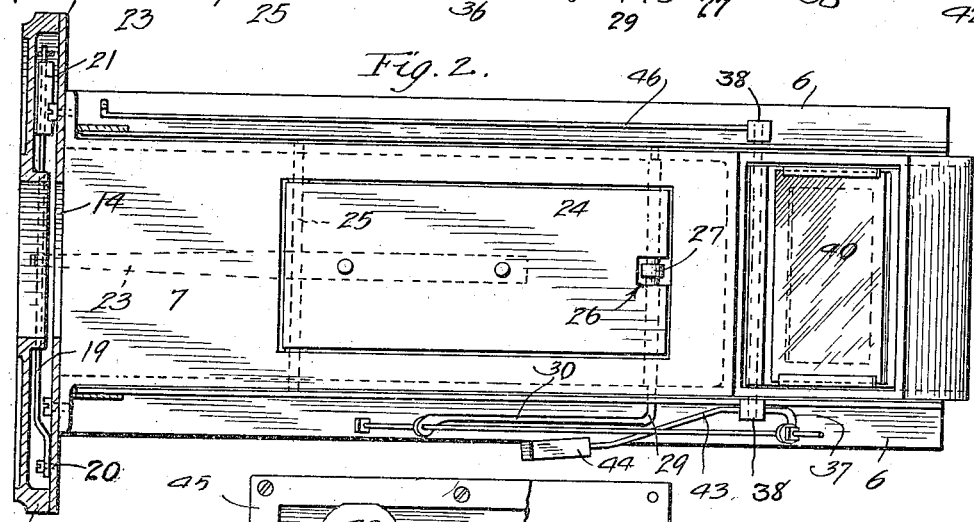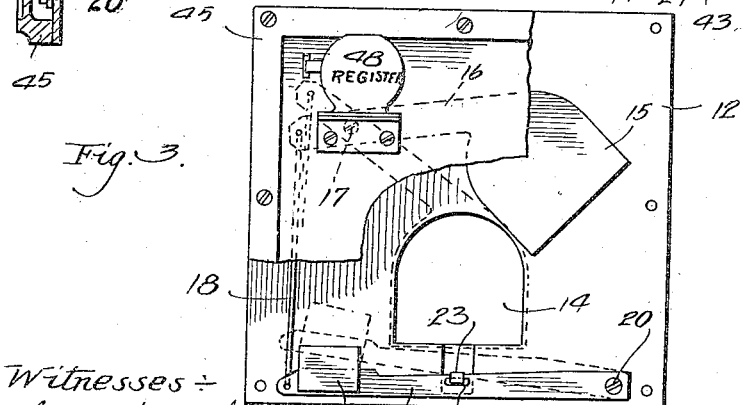

DAVID L. LEVEY, OF LOS ANGELES, CALIFORNIA.

RODENT-TRAP.

1,137,640.

Specification of Letters Patent.  Patented Apr. 27, 1915.

Application filed November 3, 1913. Serial No. 798,847.

*To all whom it may concern:*

Be it known that I, DAVID L. LEVEY, a citizen of the United States, residing at Los Angeles, in the county of Los Angeles and State of California, have invented new and useful Improvements in Rodent-Traps, of which the following is a specification.

This invention relates to rodent traps, and the principal object is to provide a rodent trap which is particularly adapted for use in buildings, and more particularly provides an entrance way for an exterminating system with a plurality of closures, whereby it is impossible for the rodent to retrace or change its course of direction to escape.

It is a further object to provide a trap with a normally open entrance which is closed by means of a pivoted floor operated by the weight of the rodent a sufficient distance within the inclosure to allow complete entrance of the animal before the entrance is closed.

It is a further object to provide an outlet to a rodent trap with a closure which immediately responds to the weight of the rodent and permits the escape from the entrance chamber, at the same time automatically releasing the pivoted floor to again open the entrance.

In the drawings accompanying this specification and forming therewith the application for Letters Patent: Figure 1 is a central longitudinal section, a portion of the cage walls being shown in side elevation. Fig. 2 is a section on the line 2—2 of Fig. 1, viewed in the direction indicated by the arrows. Fig. 3 is a view of the front entrance, a portion of the front wall being broken away to clearly show the door in elevated or open position.

More specifically in the drawings, 5 designates the base of the trap provided with the two lower flanges 6, which are horizontally disposed to form the base proper, the floor 7 being elevated slightly above these flanges to afford a space thereunder for the working members supported on the side walls 8. Secured to these side walls is a wire netting 9 which forms a hood or cover for closing the passageway or runway from the entrance 10 to the exit end 11. The entrance 10 is preferably formed of a plate of metal 12 having an entrance 14 therein preferably of less size than the adjacent hood 9. Pivotally mounted on the front face of this entrance plate is a door 15, the arm 16 being pivoted at the point 17 and extending beyond this point, is engaged by the operating rod 18, the opposite end of which rod is hooked into the free end of the weighted arm 19, which is pivoted at its opposite end by the pivot pin 20.

The weight 21 is secured to the end of the arm 19 adjacent the rod 18. Intermediate the ends of the arm 19 is a slot 22 which engages the free end of a lever 23 secured to the pivotal section 24 of the floor 7. The floor 7 is cut out for a portion and within this is mounted the pivotal section 24 which is pivoted on a transverse pin 25 disposed toward the entrance end, the opposite or inner end of this floor being provided with a notch 26 which permits the engagement of a latch 27 when the section 24 of the floor is depressed, this latch 27 having a hook 28, which fits over the floor and locks the same the latch being pivotally mounted on a transverse hinge-pin 29, which is provided with a long arm 30 which normally rests upon the flange 6 and acts as a weight to control the latch action. The weighted lever 19 engaging with the arm 23 normally holds the section of the floor 24 in the position shown in Fig. 1 with the door 15 open as shown in Fig. 3.

The arm 30 is preferably bent upward adjacent its free end forming an arm 35, which has an aperture therein to form a sliding connection with the rod 36 connecting with the rod 37 mounted on the pivoted shaft 38 secured to the inclined exit door 39. This door consists of a metal plate having a large aperture therein which is preferably closed by a glass plate 40 so that light from the entrance 14 will be transmitted through the runway 42 with which the trap is adapted to register. The side walls 8 being preferably extended to this point to form solid side walls between which the door 39 is hinged, suitable bearings being provided in these end walls. A second arm 43 is secured to the shaft 38, the outer end being provided with a weight 44 which normally holds the door in the closed position shown in Fig. 1, but is not of too great a weight to prevent the weight of the rodent compressing the door 39 to the position shown in dotted lines and thereby forming the inclined floor down which the animal is impelled into the passage 42. The door 39 in moving downward pulls the rod 36 to the position shown in dotted lines in Fig. 1 which releases the latch 27 and allows the door 15 to be again lifted leaving the entrance open for the reception of the next rodent.

A suitable covering plate 45 is secured to the plate 12 which provides a proper finish and cover plate for the mechanism inclosed between the inner face and the plate 12. Also secured to the opposite end of the shaft 38 is a bent rod 46 which is connected with a lever 47 pivotally mounted in the register 48 secured to the front wall 45 so that the number of actuations of the door 39 by a similar number of rodents will indicate the number at the register 48.

In the operation of the invention, the animal enters the trap through the entrance 14; the door 15 and the floor section 24 being held in their uppermost position by the weight 21. The animal on passing on to the floor section 24 depresses the latter in opposition to the weight 21, thereby causing the arm 19 to elevate into the position indicated in dotted lines in Fig. 3, and at the same time causing the door 15 to move to its lowermost position to close the entrance 24 and prevent the escape of the animal; the floor section 14 being engaged by the latch 27 when the floor section is disposed in its lowermost position, thus locking the door 15 against opening when the floor section 24 is relieved of the weight of the animal which is thus entrapped in the cage 9. The animal endeavoring to escape will ascend the inclined door 39, which, on the weight 44 being overbalanced by the weight of the animal, will drop to the position shown in dotted lines in Fig. 1, thereby impelling the animal into the passage 42; the opening of the door 39 operating to actuate the latch 27 and release the floor section 24, and thereby allow the weight 21 to restore the section 24 and the door 15 to their normal positions, as before described. The door 39 will be automatically closed by the action of the weight 44 and in moving to its closed position will actuate the register 48 through the rod 46.

What I claim is:

1. A rodent trap, comprising a cage having an apertured floor, a pivoted section mounted in said aperture, a pivoted entrance gate on the cage, a weighted arm connected to said gate and to the pivoted floor section operating to normally maintain the gate in its open position and the floor section in an inclined position and operating when the floor section is rocked downwardly by the weight imposed therein to close the gate, means operating on the pivoted section for automatically locking the gate in its closed position, a normally closed inclined door forming an exit to the cage adapted to be opened by a weight imposed thereon, and means operated by the opening of said door for unlocking the gate and floor section, whereby they will be restored to normal by the action of the weighted arm.

2. A rodent trap, comprising an apertured floor, a pivoted section mounted in said aperture, a latching means adapted to latch said pivoted section, a cage adapted to cover and form a passageway over said floor and said pivoted section, a pivoted entrance gate, a weighted lever controlling said pivoted gate adapted to close the entrance to said floor, an arm engaging said weighted lever connected to said pivoted section, an apertured arm connected with said latching means, a pivoted gate controlling the exit from said floor, an apertured arm secured to said hinged door forming an exit from said chamber, a weighted arm secured to said hinged door, and a connecting rod connecting said apertured hinged door arm and said apertured latching arm.

In witness that I claim the foregoing I have hereunto subscribed my name this 27th day of October, 1913.

DAVID L. LEVEY.

Witnesses:
 IRIE WELCH,
 MARIE BATTEY.

Copies of this patent may be obtained for five cents each, by addressing the "Commissioner of Patents, Washington, D. C."